Feb. 27, 1945.  H. R. ELLINWOOD  2,370,397
HYDRAULIC VALVE
Filed March 10, 1941

Inventor:
HERMAN RAY ELLINWOOD
By R. S. Berry
Attorney.

Patented Feb. 27, 1945

2,370,397

UNITED STATES PATENT OFFICE 2,370,397

HYDRAULIC VALVE

Herman Ray Ellinwood, Glendale, Calif., assignor to Adel Precision Products Corp., Burbank, Calif., a corporation of California Application March 10, 1941, Serial No. 382,554

2 Claims. (Cl. 251—167)

The present invention relates to valves for controlling hydraulically operated mechanisms of airplanes.

An object of my invention is to provide a valve construction of the character described in which a novel valve seat assembly is arranged in such manner as to permit of convenient interchange of parts without dependence on the use of screw threaded assemblies and costly machining and fitting operations.

Another purpose is to provide an improved valve assembly having an especially designed seat member to insure ample flow of hydraulic fluid with a minimum of turbulence.

With the foregoing objects in view together with such other objects and advantages as may subsequently appear the invention is carried into effect as illustrated by way of example in the accompanying drawing in which.

Figure 1:
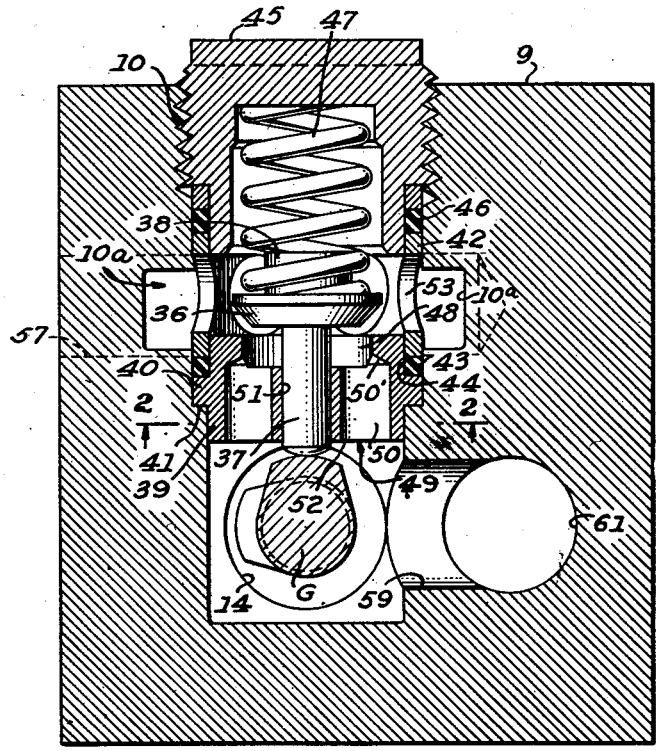
Fig. 1 is a sectional view of a valve embodying my invention.

Referring to the drawing more specifically, one embodiment of my invention includes a valve body 9 having a cylindrical valve-receiving bore 10 opening at its inner end into a cam shaft bore 14 for a cam shaft G.

The valve receiving bore 10 is provided with a counterbore 10a into which a fluid passage 57 opens, and as shown in Fig. 1, the cam shaft passage 14 is afforded communication with a fluid passage 61 by means of a port 59, whereby fluid may flow through the bores 10 and 14 from one of said fluid passages to the other.

A valve member 36 having a depending stem 37 and a spring holding boss 38 is adapted to seat against the upper end of a cylindrical seat member 39 fitted in the lower end of the bore 10. This seat member has an annular external flange 40 seated on an annular shoulder 41 in said bore. A sealing sleeve 42 telescopes the upper end of the seat member 39 and holds a compressible sealing ring 43 in an annular external recess 44 in the upper end of the seat member. This sleeve also telescopes the inner end of a screw threaded cap 45 and holds sealing rings 46 between it and the cap, while also holding the valve seat 39 in place. A spring 47 disposed between the valve member 36 the cap 45, holds the valve seated. Radial ports 53 in the sleeve 42 opens into the counterbore 10a.

Figure 2:
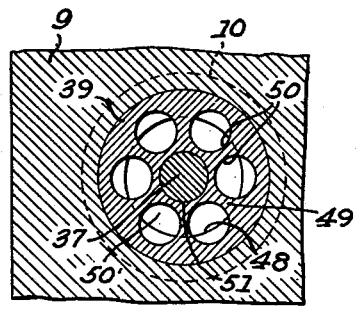
Fig. 2 is a fragmentary sectional view taken on the line 2—2 of Fig. 1.

The valve seat 39 is open at its lower end for communication with the cam shaft bore 14. Below its seating edge the seat member 39 is formed with a cylindrical chamber or recess 48 of considerable depth, and below this chamber or recess is a spider-guide 49 formed by drilling a circular series of openings or ports 50 and a center valve stem bore 51 through a wall 52 which would otherwise close the lower end of the seat member. As shown in Fig. 2, the openings or ports 50 are of such size and disposition that together with the chamber 48 beneath the valve seating edge, there will be provided ample passageway to insure an unrestricted and ample flow through the valve assembly. It should be noted that the ports 50 at their upper ends, intersect and extend into the cylindrical wall of the chamber or recess 48, forming recesses 50' in said wall whereby to insure ample flow without restriction, through said ports. The recess 48 has substantially the same diameter as the seat 39 while the circular series of ports 50 have an area at least equal to the area of said recess by reason of the manner in which they are cut into the recess. This arrangement insures ample flow without appreciable turbulence and pressure drop.

It will now be apparent that the valve hereof affords a ready interchange of parts and ease of assembly and that the seat member 39 has especially designed passages and ports therethrough for communication with the cam shaft bore 14.

While I have shown and described a specific embodiment of my invention I do not limit myself to the exact details of construction set forth, and the invention embraces such changes, modifications and equivalents of the parts and their formation and arrangement as come within the purview of the appended claims.

I claim:

1. In a valve assembly, a body having a bore therein, a seat member fitted in said body and having a valve seat at one end and a cylindrical recess next adjacent said valve seat also a circular series of ports each extending axially through the other end of the seat member and partly into the wall of and communicating with said recess, and a valve member associated with said seat, said recess being of substantially the same diameter as said seat, said circular series of ports being of an area at least equal to the area of said recess.

2. In a valve assembly, a body having a bore therein, a seat member fitted in said body and having a valve seat at one end and a cylindrical recess next adjacent said valve seat also a circular series of ports each extending axially through the other end of the seat member and partly into the wall of and communicating with said recess, a valve member associated with said seat, said seat member having a valve stem bore centrally of said circular series of ports and a stem on said valve slidable in the bore therefor, said recess being of substantially the same diameter as said seat, said circular series of ports being of an area at least equal to the area of said recess.

HERMAN RAY ELLINWOOD.